United States Patent Office 3,281,275
Patented Oct. 25, 1966

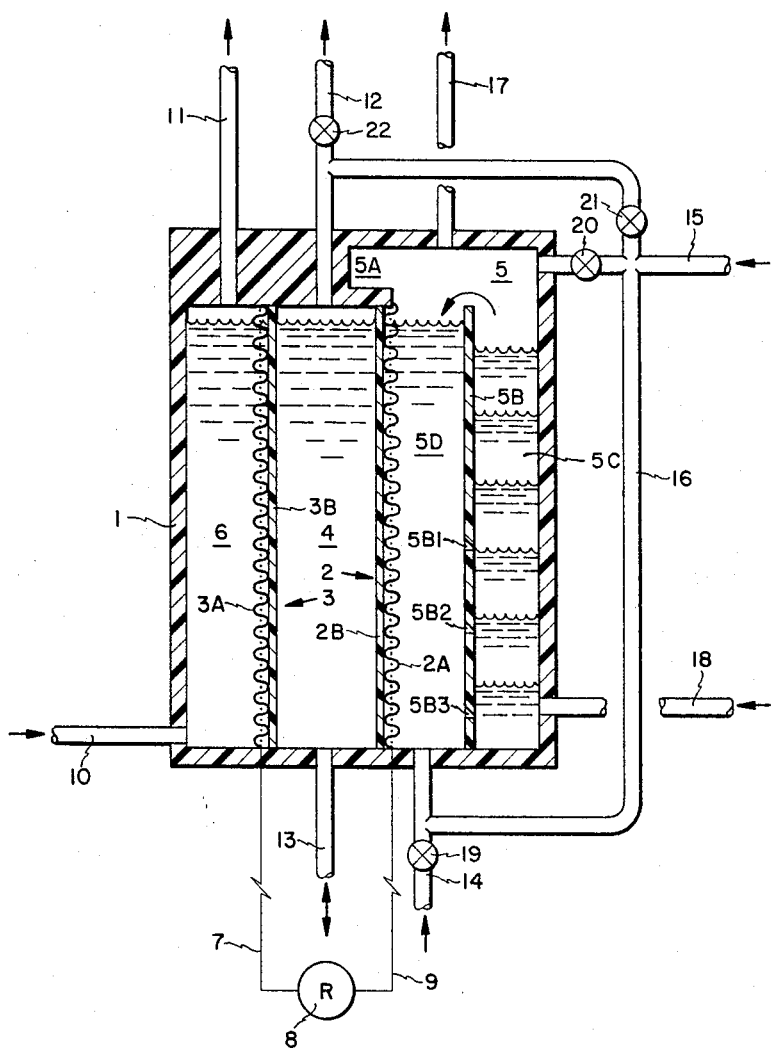

3,281,275
FUEL CELL COMPRISING METAL SCREEN ELECTRODES
Duane G. Levine, Colonia, Charles H. Worsham, Fanwood, and Barry L. Tarmy, Berkeley Heights, N.J., assignors to Esso Research and Engineering Company, a corporation of Delaware
Filed Oct. 29, 1962, Ser. No. 233,800
6 Claims. (Cl. 136—86)

This invention relates to electrochemical cells which employ an aqueous electrolyte and wherein a barrier to mass transport of products and/or reactants is positioned between opposing half-cells. In particular, this invention relates to novel fuel cells wherein a liquid combustible fuel is converted by anodic oxidation to a gaseous product or a soluble product which is compatible with the opposing cathode. The complementary processes of the opposing half-cells require keeping the electrolyte associated with one half-cell substantially free of reactants and/or products associated with a half-cell of opposite polarity. More particularly, this invention relates to fuel cells wherein effective operation of the total cell is dependent upon effective separation of fuel and oxidant and products thereof.

The term "fuel cell" is used herein and in the art to denote a device, system or apparatus wherein chemical energy of a fluid combustible fuel such as hydrogen, carbon monoxide or an organic compound containing hydrogen in its molecular structure is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode respectively, which are separated by an electrolyte which provides ionic conductance therebetween, conduction means for electrical connection between such anode and cathode external to such electrolyte, means for admitting a fluid fuel into dual contact with the anode and electrolyte and means for admitting a fluid oxidant into duel contact with the cathode and electrolyte.

In the past efforts have been made to separate the anolyte and catholyte by positioning an ion-permeable and/or ion-exchange membrane between the electrodes. Unfortunately, however, materials have not been found which will admit of effective ionic conductance between the electrodes and at the same time prevent substantial transfer of reactants for any appreciable period of time.

The electrolyte compartment of the instant fuel cells is divided into an anolyte compartment and a catholyte compartment by one or more ion-permeable partitions or ion-exchange membranes. The preferred number of membranes is 1 through 4. In each such cell a fuel is oxidized at the anode with a release of electrons thereto and an oxidant is reduced at the cathode upon receiving electrons from such cathode.

It has now been discovered that the aforementioned separation can be effected by employing a properly designed electrode in a novel combination with conventional separation materials. This combination makes possible effective operation with a lower concentration of reactants than has been required in cells previously known to the art. This lower concentration in turn minimizes the problems of reactant migration per se and in combination with the novel electrode arrangement improves the opportunities of the migrant to react electrochemically before it can leave its respective half-cell. The most effective fuel concentration range is from about 0.05 volume percent to about 5.0 volume percent. Thus, with methanol the concentration should be in the range of about 0.15 volume percent to about 2.0 volume percent. The methanol range can be used as a guide for other reactants taking into consideration the intended reactant.

The degree to which a given half-cell can tolerate reactants and/or products migrating from a half-cell of opposite polarity without appreciable loss in reaction rate within the half-cell receiving such contaminant is to a degree dependent upon the composition of the reactants and/or products of both the anode and cathodic half-cells. The efficiency of reactant utilization by the total cell is likewise dependent upon reactant separation and the chemical composition of the reactants that become intermixed. The chemical and physical properties of the reactants and/or products such as solubility, vaporization temperature and reactivity may tend to increase or decrease the complexity of the separation although the general problem of separation is common to all cells employing an aqueous electrolyte. For example, a cell operating with an anolyte soluble fuel such as methanol and a catholyte soluble oxidant such as nitric acid will present one embodiment of the problem. In other embodiments either the fuel or oxidant may differ from the embodiment above set forth, e.g., the use of an electrolyte immiscible fuel or a gaseous oxidant; since in each such case there will remain one electrolyte soluble reactant whose presence must be restricted to the intended half-cell.

Electrode pairs, i.e., an anode and a cathode, employed in this invention are separated by 1 or more porous membranes arranged between the anode and the cathode, preferably in parallel relationship with the electrodes. Each of the electrodes is juxtaposed with a membrane. The anode and cathode may be in juxtaposition with a common membrane or each of said electrodes may be juxtaposed with different membranes, e.g., see the electrode-membrane grouping in the drawing. Each of the electrodes are preferably positioned in contact with one of the membranes throughout their length and breadth. If not in actual physical contact with the membrane, the electrode should be positioned as close to the membrane as possible and should not be spaced apart from the membrane by more than about 1 millimeter, the preferred spacing being from about 0.001 to 1.0 millimeter. The electrode is positioned between the membrane and the reactant inlet to the electrolyte of the half-cell such that all or essentially all of the reactant must pass through the electrode before contacting the membrane.

The electrodes employed comprise a conductive wire screen with a catalyst-bearing or catalyst-comprising surface, e.g., a wire screen upon which platinum or other suitable catalyst has been chemically or electrochemically deposited by methods known in the art. The size of the electrode mesh is critical.

The electrode should provide surface area sufficient to assure contact of the reactant and allow for the requisite reaction before significant amounts of the liquid reactant can escape through the membrane. The mesh diameter and depth, i.e., distance between the front and back of electrode, is therefore controlled to provide the requisite reaction area. In cells of the type herein described, the reactants employed require for effective operation current densities in the range of about 25 to 100 milliamperes per square centimeter, electrodes having mesh diameters in the range of 0.001 to 0.050 inch. Thus, with methanol the mesh should have a diameter in the range of 0.005 to 0.015 inch. The methanol range can be used as a guide for other reactants taking into consideration relative number of electrons involved in the electrochemical oxidation compared with methanol. Thus, with organic fuels of greater molecular complexity the upper portion of the aforestated general range will be preferred. With nitric acid the lower portion of the range will be most effective, e.g., 0.001 to 0.010 inch. The depth of the electrode, i.e., the length from the face to the back of the electrode, should be in excess of about 0.001 inch, preferably in the range of 0.001 to 0.010 inch. The depth of the electrode should be sufficient to allow essentially all of the reactant to contact the electrode before passing through the membrane. Depths in excess of that required to provide necessary surface area merely add unnecessarily to the size and cost of the cell. The ratio of the actual surface area of the electrode to the apparent surface area is between 0.50 to 2.0. The preferred range is from about 0.75 to 1.50. The actual surface area is the area of the wire composing the screen assuming said wire to have a smooth surface. The apparent surface area is the area of a smooth plate having the same length, width and depth as the wire screen electrode.

The pore diameters of the membrane are much smaller than diameters of the mesh of the electrode, the pore diameters being in the range of about 5 A. to 50 A. The membrane acts as a barrier to mass transport of reactants between opposing half-cells so as to increase the reactant concentration at the respective electrodes.

The fuel or oxidant is caused to react electrochemically upon contacting the electrode through which it must pass before reaching the membrane. The electrode-membrane combination of this invention is effective with those liquid reactants which are electrochemically converted to gaseous products upon contacting the electrode of the half-cell to which they are introduced. This electrode-membrane combination is also effective with those liquid reactants which are electrochemically converted to soluble products which are compatible at the opposing electrode.

The gaseous product following the path of least resistance escapes upward through the electrolyte from whence it either exits from the cell or in certain embodiments with certain oxidants is reconverted to liquid within the cell.

All membranes to be used with this invention are porous structures having a porosity of about 10% to 80%. The membrane presents a continuous surface extending between and around the pore openings.

Ion-exchange resin membranes, i.e., organic membranes, at least one component of which is a polyelectrolyte, are well known in the art. Such membranes include in their polymeric structure dissociable ionizable radicals at least one ionic component of which is fixed to or retained by a polymeric matrix with at least one ion component being a mobile and replaceable ion electrostatically associated with the first component. The ability of the mobile ion to be replaced under appropriate conditions by other ions imparts ion-exchange characteristics to these materials.

The best known of the ion-exchange membranes are the ion-exchange resin membranes which may be prepared by copolymerizing a mixture of ingredients one of which contains an ionogenic substituent. In the case of cationic-exchange resins, these groups are acidic groups, such as the sulfonic acid group, the carboxylic acid group, and the like. In the case of anion-exchange resins, the group is basic in nature and may comprise amine groups, ordinary ammonium groups, the guanidine group, the dicyandiamide group and other nitrogen-containing basic groups. In the case of these anion-exchange resins, the ionizable group is attached to a polymeric compound, such as phenol-formaldehyde resin, a polystyrene divinyl benzene copolymer, an urea-formaldehyde resin, a melamine-formaldehyde resin, a polyalkylene-polyamine-formaldehyde resin, etc. Thus, typical cation resins may be prepared by copolymerizing an n-phenol sulfonic acid with formaldehyde. A typical anion resin may be prepared by copolymerizing a mixture of phenol, formaldehyde and triethylene-tetramine. The preparation and properties of a number of different types of cation-exchange resins are described throughout the literature and in particular in "Ion Exchange," Nachod, Academic Press, Inc., New York (1950); "Ion Exchange Resins," Kunin & Myers, John Wiley & Sons, Inc., New York (1950); "Styrene, Its Polymers and Copolymers and Derivatives," Boundy & Boyer, Reinhold, New York (1950) and in various U.S. patents, e.g., Langer, 2,891,999 and 2,861,045; Bodamer, 2,681,319–20; D'Alelio, 2,366,007–8 and 2,663,702; Hutchinson, 2,678,306; Ferris, 2,658,042, etc.

The formation of these ion-exchange resins into membrane or sheet form is well known in the art. In general, these membranes are of two forms, the mosaic in which granules of ion-exchange resin are incorporated into a sheet-like matrix of a suitable binder, such as a binder of polyethylene or polyvinyl chloride, and the continuous ion-exchange resin membrane in which the entire membrane structure has ion-exchange characteristics. The latter type of membrane may be formed by molding or casting a partially polymerized ion-exchange resin into sheet form. The formation of these ion-exchange membranes is described, for example, in "Amperplex Ion Permeable Membranes," Rohm & Haas Co., Philadelphia (1952), and in the references mentioned in this publication.

The ion-exchange resin membranes above-described have heretofore been employed in fuel cells as electrolytes, electrolyte dividers, etc., and may be used in the practice of this invention. However, membranes of this type ordinarily have a relatively high internal electrolytic resistance and are therefore not as desirable for use in fuel cells as are the so-called interpolymer ion-exchange membranes.

An interpolymer membrane is one which is cast from a solution containing both a polymeric electrolyte or ionogenic material and a matrix polymer so as to form a film composed of these two intermeshed molecular species. A typical interpolymer membrane is made by dissolving linear polystyrene sulfonic acid and acrylonitrile in N,N-dimethylformamide, casting the solution as a film and evaporating off the solvent. The type of polyelectrolyte used can range from the strong acid type as described above to those which are strong bases, such as quaternary polyvinyl imidazolium hydroxides. Membranes of this type are described in U.S. Patent 2,957,206. See also articles by H. P. Gregor et al. in vol. 61, "Journal of Physical Chemistry," 1957 at pages 141, 151 and 197 and the pages immediately following these citations.

Particularly suitable for use in this invention are membranes having a fluorocarbon matrix which is cationic sulfonated by means of a styrene graft using chlorosulfonic acid for sulfonation by methods known in the art.

Referring now to the accompanying exemplary drawing wherein there is shown a schematic vertical cross section of a fuel cell adapted for internal regeneration of the primary oxidant and effective separation of fuel and oxidant, there is shown a fuel cell container or vessel 1, containing a cathode assembly 2, an anode assembly 3, a central electrolyte compartment 4, a catholyte compartment 5 and an anolyte compartment 6. Cathode assembly 2 and anode assembly 3 each include a wire screen electrode 2A and 3A respectively, surfaces of which are coated with a suitable catalytic material. Such electrode screen members are employed in conjunction with a porous organic membrane. Such membranes 2B and 3B respectively, are in contact with the respective screen member and positioned between the respective screen member and central electrolyte compartment 4. Electrodes 2A and 3A are electrically connected via wires 7 and 9 and resistance means 8 which is symbolic of any electrical device or appliance adapted for receiving its power of activation from a direct electric current. Fuel inlet conduit 10 provides means for introducing an electrolyte soluble fuel, e.g., methanol, into anolyte compartment 6 which is here shown to be substantially filled with an aqueous sulfuric acid electrolyte. Fuel exhaust conduit 11 provides means for removing carbon dioxide formed at anode 3A in electrochemical oxidation of the fuel. The central electrolyte compartment 4 is shown equipped with conduits 12 and 13 which may be utilized for a variety of purposes. These include providing escape means for any gaseous product formed at either of the electrodes which may escape from their respective compartments through membranes 2B and 3B, providing means for replenishing electrolyte in compartment 4 and to provide means for flushing or cleansing the compartment. In catholyte compartment 5 there is shown a foam regeneration zone 5A comprising the enlarged upper portion of catholyte compartment 5. Below zone 5A compartment 5 is separated by an electrolyte permeable barrier 5B into a cathodic reaction zone 5D and catholyte recycle zone 5C. Catholyte compartment 5 is in this embodiment, shown communicating with a lower air inlet conduit 14 and an upper air inlet conduit 15. Conduits 12, 14 and 15 are connected by pressure control conduit 16 which in addition to valves 19, 20, 21 and 22, provide control means for maintaining a balance of pressure in catholyte compartment 5 and central electrolyte compartment 4. During operation, said valves will normally be open. Catholyte compartment 5 also communicates with air exhaust conduit 17 providing means of escape for air or other oxidant, e.g., oxidant gas admitted to catholyte compartment 5 via conduits 14 and 15. In a preferred embodiment, air is admitted to recycle zone 5C of catholyte compartment 5 so as to provide a bubble-like or slug type flow of air and electrolyte upward through zone 5C into regeneration zone 5A where additional air is admitted from conduit 15. The electrolyte in catholyte compartment 5 comprises aqueous sulfuric acid, e.g., 30 wt. percent to which the primary oxidant, nitric acid has been added. In the embodiment shown in the figure both oxidant and electrolyte may be added to catholyte compartment 5 via inlet conduit 18. As electrolyte, primary oxidant and air are passed downward through reaction zone 5D the primary oxidant, i.e., $HNO_3$ or a reducible reduction product thereof is electrochemically reduced upon contact with cathode 2A. Part of the gaseous reduction products rise upward to zone 5A where they are mixed with secondary oxidant and electrolyte to regenerate nitric acid. The remaining reduction products are carried by the electrolyte through the openings in barrier 5B into the recycle zone 5C where said reduction products are mixed with secondary oxidant and electrolyte to regenerate nitric acid. The secondary oxidant entering through inlet 14 forces the liquid to the top of zone 5C where it spills over into zone 5D. The foam producing surfactant may be introduced into catholyte compartment 5 via any of the inlet conduits, e.g., 14, 15 or 18. A stable small bubble foam is maintained in regeneration zone 5A entrapping the aforementioned NO and oxygen and facilitating the reoxidation thereof to nitric acid as hereinbefore explained. The liquid electrolyte together with the regenerated nitric acid spills over into catholyte reaction zone 5D from whence it reenters recycle zone 5C through one or more openings in barrier 5B. As here shown, barrier 5B has several openings, $5B_1$, $5B_2$ and $5B_3$ in the lower portion thereof for the return flow of electrolyte and primary oxidant reduction products to recycle zone 5C. As here shown, these pores or channels diminish in diameter at the end opening into the recycle zone 5C to minimize the escape of air from zone 5C.

The foregoing description describes one mode of operation of our invention. However, it is to be understood that said description does not limit the scope of our invention. A routineer in the art could easily modify the cell design, regenerate the oxidant external to the cell or vent the anolyte chamber so as to allow the gases to freely excape. Modifications such as the foregoing or other mechanical changes are considered to be within the scope of the invention as claimed.

The following tests were carried out to illustrate the cell efficiency resulting from the use of our electrode-membrane system. The details of procedure and the results obtained are set forth hereinafter. The test results are presented for purposes of illustration only and the details herein should not be construed as limitations upon the true scope of the invention as set forth in the claims.

An electrochemical cell as described by the accompanying drawing was used to test the efficiency of the electrode-membrane system of this invention. To test the efficiency of the cell the number of membranes used was varied from none through 4. The electrodes consisted of 52 and 80 mesh platinum electrodes with 8 milligrams of platinum black per square centimeter deposited thereon. The electrolyte was 30 weight percent sulfuric acid. The fuel was continuously fed as 0.25 mole of methanol per liter of sulfuric acid electrolyte in the anolyte compartment, i.e., 1 volume percent methanol. The oxidant was 1 weight percent nitric acid continuously maintained in the catholyte compartment. The cell was run continuously until a significant activity loss at the electrodes was observed, i.e., the current flow and cell voltage dropped sharply to 0 due to mixing of the fuel and oxidant. The following results were observed.

The cell could not be started unless the separation techniques described herein were employed. Thus, the concentrations of reactant and oxidant supplied to the anode and cathode respectively were sufficient to destroy the activity at the opposing electrode. With a membrane placed between the fuel and oxidant chambers, but without the proper configuration of the electrodes as herein described, less than 20 hours of compatible operation were achieved with the principal electrical losses at the cathode. Similar results were obtained without the membrane but with the proper electrode configuration. With both the proper arrangement of electrodes and membrane as herein described, such a cell was assembled and operated continuously for 55 hours without failure at either electrode due to mixing of the non compatible reactants. After 55 hours the test was discontinued. It has further been demonstrated that the cathode activity under these conditions can be maintained for 150 hours or more.

The fuels that may be employed with our fuel cells include soluble carbonaceous fuels which are electrochemically converted to gaseous products upon contacting the anode.

Carbonaceous fuels soluble in the electrolyte such as alcohols, glycols, $C_2$–$C_5$ monoolefins, diolefins are examples of fuels that may be employed in our fuel cells.

The oxidants that may be employed in our fuel cells are soluble oxidizing fluids such as chlorine, oxygen, air and nitric acid.

What is claimed is:

1. In a fuel cell comprising an anode and a cathode the improvement comprising in combination a catalyst coated, wire screen nonsacrificial electrode and a porous electronically insulative membrane in contact with said electrode, said electrode having a ratio of actual surface area to apparent surface area of between 0.50 and 2.0, said electrode having a depth of between 0.001 and 0.01 inch and mesh diameters of between 0.001 and 0.05 inch, said membrane pore diameters being in the range of about 5 A. to about 50 A.

2. In a fuel cell employing an aqueous electrolyte and a liquid fuel, the improvement comprising nonsacrificial metal screen electrodes comprising an anode and a cathode; a first electronically insulative membrane interposed between said anode and said cathode and in contact with said anode; a second electronically insulative membrane interposed between said anode and said cathode and in contact with said cathode, said anode and said cathode each being in juxtaposition with said first and said second interposed membranes; said metal screen electrodes having a mesh diameter of about 0.001 to about 0.05 inch, a depth of about 0.001 to about 0.01 inch and a ratio of actual surface area to apparent surface area of about 0.5 to about 2.0, said membranes each having pore diameters in the range of about 5 A. to about 50 A.

3. A fuel cell as defined by claim 2 wherein the porosity of said membrane is in the range of about 10 to 80 percent.

4. In a fuel cell employing an aqueous electrolyte and a liquid fuel, the improvement which comprises nonsacrificial metal screen electrodes comprising an anode and a cathode; a first electronically insulative membrane interposed between said anode and said cathode positioned apart from said anode by about 0.001 to about 1.0 millimeter; a second electronically insulative membrane interposed between said anode and said cathode and positioned apart from said cathode by about 0.001 to about 1.0 millimeter; said metal screen electrodes having mesh diameters in the range of about 0.001 to about 0.05 inch, a depth of about 0.001 to about 0.01 inch and a ratio of actual surface area to apparent surface area of about 0.5 to 2.0, said membranes each having pore diameters in the range of about 5 A. and 50 A.

5. A fuel cell as defined in claim 4 wherein said membrane has a porosity in the range of about 10 to 80 percent.

6. In a fuel cell comprising an anode and a cathode the improvement comprising in combination a catalyst coated, wire screen nonsacrificial electrode and a porous membrane, positioned apart from said electrode by about 0.001 to about 1.0 millimeter said electrode having a ratio of actual surface area to apparent surface area of between 0.50 and 2.0, said electrode having a depth of between 0.001 and 0.01 inch and mesh diameters of between 0.001 and 0.05 inch, said membrane pore diameters being in the range of about 5 A. to about 50 A.

References Cited by the Examiner
UNITED STATES PATENTS

| | | | |
|---|---|---|---|
| 2,800,521 | 7/1957 | Olcott et al. | 136—125 |
| 2,901,523 | 8/1959 | Justi et al. | 136—86 |
| 2,913,511 | 11/1959 | Grubb | 136—86 |
| 3,116,170 | 12/1963 | Williams | 136—86 |

WINSTON A. DOUGLAS, *Primary Examiner.*
ALLEN B. CURTIS, *Examiner.*